Oct. 2, 1928.
C. S. HALL
1,686,084
AIRCRAFT
Filed Sept. 15, 1926    2 Sheets-Sheet 1
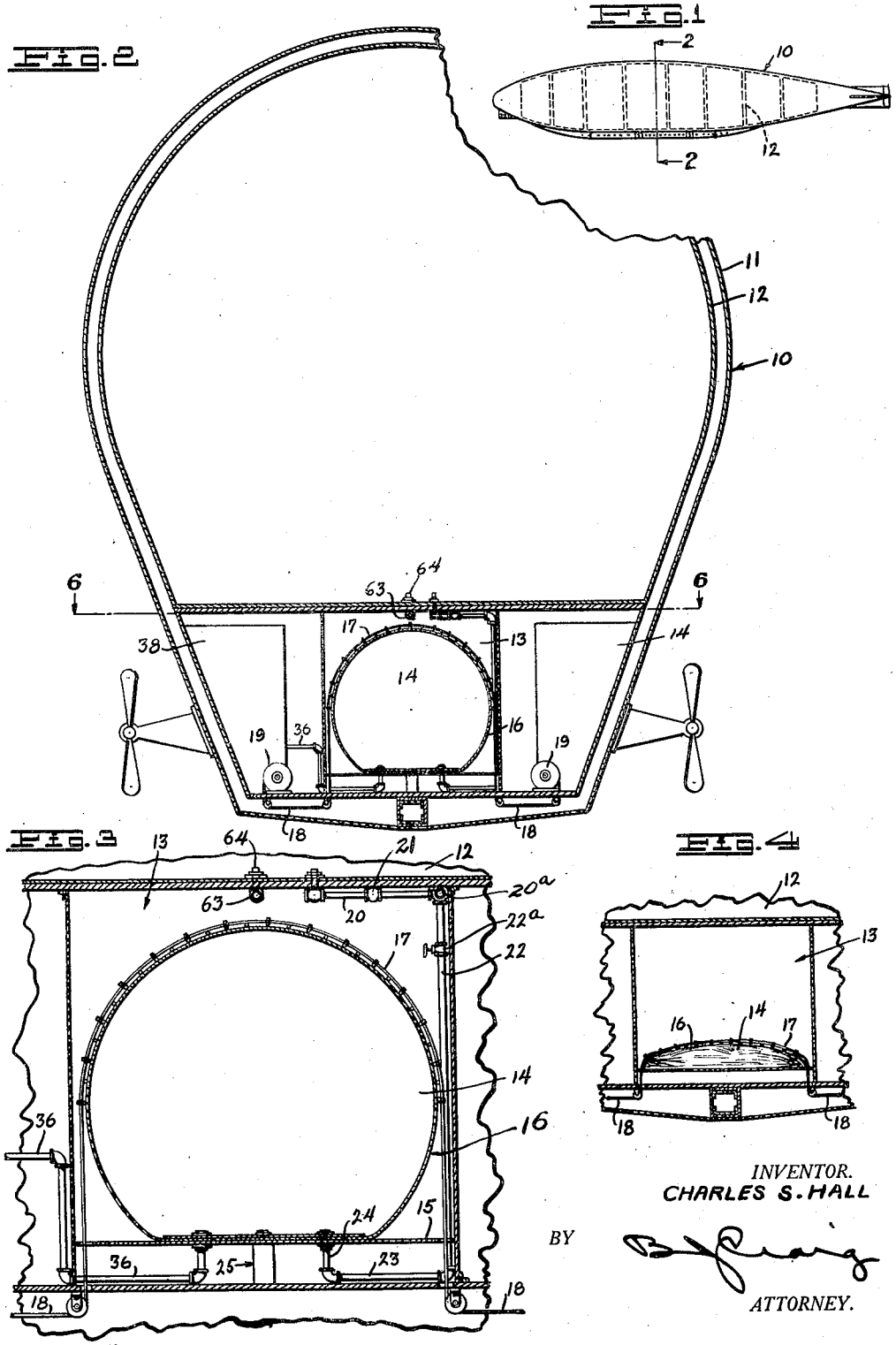
INVENTOR.
CHARLES S. HALL
BY
ATTORNEY.

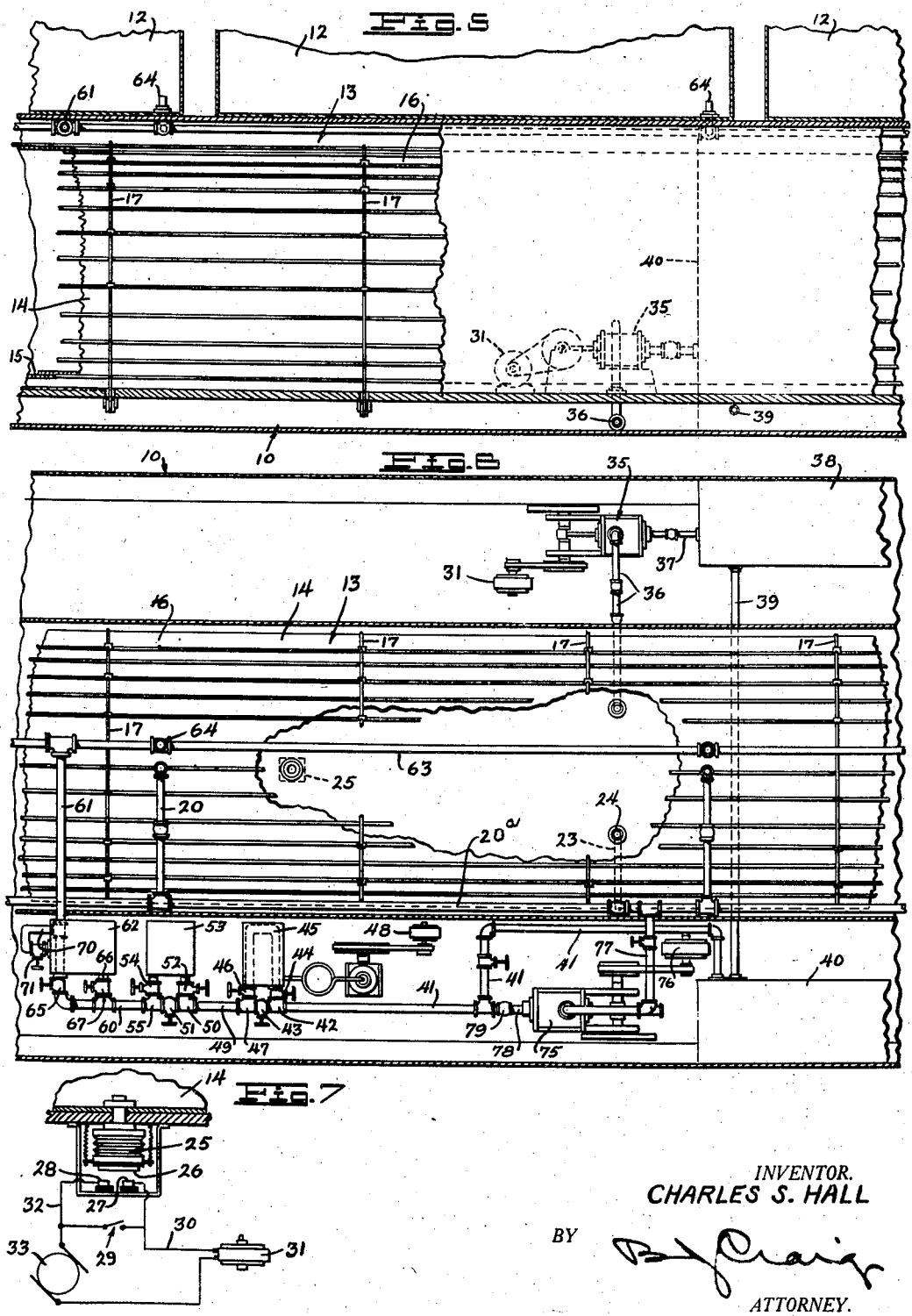

Patented Oct. 2, 1928.

1,686,084

UNITED STATES PATENT OFFICE.

CHARLES S. HALL, OF OAKLAND, CALIFORNIA.

AIRCRAFT.

Application filed September 15, 1926. Serial No. 135,507.

This invention relates to aircraft.

The general object of the invention is to provide an improved gas control apparatus for lighter than air aircraft.

A specific object of the invention is to provide a lighter than air aircraft having a gas bag therein which operates in conjunction with a novel form of auxiliary gas container.

Another object of the invention is to provide improved means for controlling the buoyancy of an aircraft.

A further object of the invention is to provide means for shifting the center of buoyancy of an aircraft.

Another object of the invention is to provide a novel means for controlling the gas supply in an aircraft.

An additional object of the invention is to provide means for selectively purifying, cooling and heating the gas in an aircraft.

Other objects of the invention will be apparent from the following description taken in connection with the accompanying drawings wherein:

Fig. 1 is a side elevation of an aircraft embodying the features of my invention;

Fig. 2 is a section on line 2—2 of Fig. 1;

Fig. 3 is an enlarged sectional view showing the details of the auxiliary gas container;

Fig. 4 is a fragmentary view showing the auxiliary gas container collapsed;

Fig. 5 is a fragmentary longitudinal central view showing details of the auxiliary container;

Fig. 6 is a horizontal sectional view showing details of the auxiliary container and Fig. 7 is a sectional view showing details of a control mechanism.

Referring to the drawing by reference characters, I have shown my invention as applied to a lighter-than-air aircraft shown as a dirigible 10.

I have shown the aircraft composed of an outer body 11, having a plurality of gas holding compartments 12 therein. These gas holding compartments 12 are arranged side by side in the upper portion of the body while the lower portion is provided with a longitudinally extending passageway 13 in which a flexible auxiliary gas container 14 is arranged. This gas container is shown as provided with a rigid bottom portion 15 on which a flexible member 16 made of fabric or other material is arranged. The auxiliary container preferably extends beneath several of the compartments 12.

In order to cause normal collapsing of the auxiliary container when deflated I may provide flexible members 17 such as ropes which are spaced along the outer portion of the auxiliary container. Each flexible member 17 has its end portions 18 extended to winding drums 19 which drums are normally under spring tension so that the normal tendency is for the drums to revolve to wind up the flexible members and thereby collapse the auxiliary container.

Each of the compartments 12 is provided with an outlet pipe 20 which has a check valve 21 therein so that gas will not pass through the pipe 20 until a certain pressure is reached in the compartment 12. When this pressure is reached the gas passes from the pipe 20 to a line pipe 20$^a$, thence to the pipe 22, thence to the pipe 23, to the coupling 24 and into the auxiliary container 14. This will inflate the auxiliary container causing the cables 17 to unwind from the drums. The pipe 22 has a valve 22$^a$ therein to control flow therethrough.

As soon as the pressure in the auxiliary container 14 reaches a certain point this pressure will act to expand a diaphragm 25 (see Fig. 7) causing a contact member 26 to bridge terminals 27 and 28. If desired instead of using the terminals 27 and 28 I may employ a hand switch 29. The terminal 27 is connected by a lead 30 with a motor 31, and the terminal 28 is connected by a lead 32 with the motor 31. The lead 32 includes a suitable source of power, such as the generator 33.

The motor 31 operates a pump or compressor 35 which is connected by pipes 36 with the auxiliary compartment 14, and by pipe 37 with a high pressure gas container 38. The high pressure gas container 38 is connected by means of pipe 39 with another high pressure gas container 40. The gas containers 38 and 40 are arranged in compartments on either side of the auxiliary container 14.

From the foregoing description it will be apparent that when the pressure in the auxiliary container 14 reaches a certain point the motor 31 will operate to pump gas from the auxiliary container and compress it in the high pressure storage tanks 38 and 40.

The high pressure container 40 is connected by means of pipes 41 with a fitting 42. This fitting 42 is connected to a valve 43, and to a valve 44. The valve 44 is in turn connected to a cooling device 45 which is connected to a valve 46, connected to a fitting 47. This fitting 47 is in turn connected to the valve 43.

In order to use the cooling device 45, which is operated by means of a motor 48, the valve 43 is closed and the valves 44 and 46 are opened. When the cooling device is not needed, valves 44 and 46 may be closed and valve 43 opened.

The fitting 47 is connected by means of a pipe 49 with a fitting 50, which is in turn connected to valves 51 and 52. The valve 52 is connected to a gas heater 53 which is connected to a valve 54, the latter being connected to a fitting 55 which is also connected to the fitting 51.

It will thus be apparent that to use the heater 53 the operator will need to close the valve 51 and open the valves 52 and 54.

The fitting 55 is connected by means of a pipe 60 with a pipe 61 which passes beneath an air purifier 62. The pipe 61 passes to a distributing line 63 which communicates through fittings 64 with the compartments 12. The pipe 61 includes a valve 65.

The pipe 60 is connected by means of a pipe 66 with the gas purifier 62, which may be of any desired character for purifying the gas passing therethrough. The pipe 66 is provided with a valve 67 to control the flow therethrough. The purifier 67 is connected by means of an angle pipe 70 with the pipe 61. This pipe 70 includes a valve 71.

In order that the gas may be taken directly from the main compartments 12 and run through the temperature changing devices 45 and 53 and the gas purifying devices 62 without first passing through the auxiliary compartment 14, I provide a pump 75 which may be operated by a motor 76. This pump 75 is connected by means of a pipe 77 with the pipe 20ª through a pipe 78 through the one-way valve 79 into the pipe 41, whence the gas passes through the fitting 42 and other parts as previously described. When the pump 75 is operated the valve 22ª previously described, will be closed so that the pump will not draw gas from the auxiliary compartment 14.

From the foregoing instruction it will be apparent that by operating the valves described in the preceding paragraphs, an operator can readily change the temperature of the gas at will, and also may cause it to be purified at will.

What I claim is:

1. In an aircraft, a gas holding compartment, a gas heating means, a gas cooling means, and a gas purifying means, and a means to remove gas from said compartment and to return it to said compartment through any one or more of said three first mentioned means.

2. An aircraft having a body provided with a gas holding compartment, a gas temperature changing device, and a gas purifying device, and means to draw gas from the compartment and to selectively change the condition of the gas so drawn from the compartment.

3. In a dirigible aircraft, a main gas holding compartment, a chamber arranged longitudinally of said compartment, an auxiliary gas container in said chamber, high pressure storage chambers arranged at each side of said chamber, means to transfer gas from said main compartment to said auxiliary said container, and means to transfer gas from the auxiliary container to the high pressure storage chambers.

4. In a dirigible, a body having a gas holding compartment therein, an auxiliary gas holding compartment having a rigid bottom and having flexible collapsible sides, a plurality of flexible members extending over said sides, a pair of spring actuated drums, said drums being connected to said flexible members and normally acting to collapse said auxiliary compartment.

5. In an aircraft, a body having a main gas holding compartment, an auxiliary gas holding compartment, means to transfer gas from said main compartment to said auxiliary compartment, a storage receptacle, means to transfer gas from said storage receptacle to said main compartment, and means to change the state of the gas at will during said last transfer.

6. In an aircraft having a main gas compartment, an auxiliary gas compartment, and a storage receptacle, devices for changing the state of the gas, and means to cause said gas to move directly from said main compartment to said devices and back to said main compartment, and other means to cause said gas to move from said main compartment to said auxiliary compartment then to said storage receptacle, thence to said devices, and then back to the main compartment.

7. An aircraft having a body provided with a plurality of main gas holding compartments, a single auxiliary gas holding compartment associated with said main compartments, means whereby the volume of the auxiliary gas holding compartment may be varied, means connecting the auxiliary compartment with the main compartments, a gas cooling device, a gas heating device, and a gas purifying device, and means to return the gas from the auxiliary gas holding compartment to the main compartments, and to selectively cause said devices to change the condition of the gas during its return.

8. In an aircraft, a main gas holding container, an auxiliary gas holding container, and means to transfer gas from said main container to said auxiliary container when the gas pressure in the main container rises to a certain point, a storage container, a pump, a motor for actuating said pump, said pump being connected to said auxiliary container, and to said storage container, and means whereby when the pressure in the auxiliary container rises to a said point, a circuit to the motor will be closed to cause said pump to pump gas from said auxiliary container to said storage container.

9. In an aircraft, a main gas holding compartment, a chamber adjacent said compartment, an auxiliary gas container in said chamber, a high pressure storage chamber, means to transfer gas from said main compartment to said auxiliary gas container, and means to transfer gas from the auxiliary compartment to said high pressure chamber.

In testimony whereof, I hereunto affix my signature.

CHARLES S. HALL.